(12) United States Patent
Miller

(10) Patent No.: US 8,581,151 B2
(45) Date of Patent: Nov. 12, 2013

(54) STEAM OVEN WATER DELIVERY AND DRAIN VALVE SYSTEMS AND METHODS

(75) Inventor: Paul E. Miller, Long Beach, CA (US)

(73) Assignee: MAG Aerospace Industries, Inc., Carson, CA (US)

( * ) Notice: Subject to any disclaimer, the term of this patent is extended or adjusted under 35 U.S.C. 154(b) by 0 days.

(21) Appl. No.: 12/917,645

(22) Filed: Nov. 2, 2010

(65) Prior Publication Data

US 2011/0100477 A1 May 5, 2011

Related U.S. Application Data

(63) Continuation of application No. 12/688,483, filed on Jan. 15, 2010.

(60) Provisional application No. 61/258,337, filed on Nov. 5, 2009.

(51) Int. Cl.
*A21B 1/00* (2006.01)
*F17D 1/14* (2006.01)

(52) U.S. Cl.
USPC ........... 219/399; 219/400; 219/401; 219/402; 137/14; 137/511; 392/394; 392/397; 392/398; 392/401; 392/402; 126/369; 126/369.1; 126/348; 99/467; 99/468; 99/473; 99/474

(58) Field of Classification Search
USPC .............. 219/399–402; 137/14, 544, 511; 392/394, 397–8, 401–2; 126/369, 126/369.1, 348; 99/467–8, 473–4
See application file for complete search history.

(56) References Cited

U.S. PATENT DOCUMENTS

| | | | |
|---|---|---|---|
| 3,639,725 | A | 2/1972 | Maniscalco |
| 3,744,474 | A | 7/1973 | Shaw |
| 4,066,011 | A | 1/1978 | Ballentine |
| 4,173,215 | A | 11/1979 | Bureau et al. |
| 4,430,557 | A | 2/1984 | Eichelberger et al. |
| 4,697,067 | A | 9/1987 | Rosset et al. |
| 4,700,685 | A | 10/1987 | Miller |
| 4,701,334 | A | 10/1987 | Durth |
| 4,722,268 | A | 2/1988 | Rightley |
| 4,835,368 | A | 5/1989 | Fortmann et al. |
| 4,851,644 | A | 7/1989 | Oslin |
| 4,920,948 | A | 5/1990 | Koether et al. |
| 5,209,941 | A | 5/1993 | Wuest |

(Continued)

FOREIGN PATENT DOCUMENTS

| | | |
|---|---|---|
| CH | 617582 | 6/1980 |
| CH | 677582 | 6/1991 |

(Continued)

OTHER PUBLICATIONS

International Search Report and Written Opinion dated Mar. 8, 2011 in related Application No. PCT/US2010/055036.

(Continued)

*Primary Examiner* — Shawntina Fuqua
(74) *Attorney, Agent, or Firm* — Dean W. Russell; Kristin M. Crall; Kilpatrick Townsend & Stockton LLP

(57) ABSTRACT

Embodiments of the present invention provide steam oven drain valve systems and methods for draining steam ovens and associated water lines on aircraft and other passenger transport vehicles.

11 Claims, 2 Drawing Sheets

(56) References Cited

U.S. PATENT DOCUMENTS

| | | | |
|---|---|---|---|
| 5,232,010 A * | 8/1993 | Rozenblatt et al. | 137/347 |
| 5,499,577 A * | 3/1996 | Tommasini | 99/476 |
| 6,100,509 A | 8/2000 | Saito | |
| 6,342,262 B1 | 1/2002 | Wuest | |
| 6,914,219 B2 | 7/2005 | Kuhne | |
| 8,288,690 B2 | 10/2012 | Boubeddi et al. | |
| 2005/0082271 A1 | 4/2005 | Kuhne | |
| 2005/0158041 A1 | 7/2005 | Hoehne et al. | |
| 2005/0279216 A1 | 12/2005 | Miller | |
| 2006/0060181 A1 | 3/2006 | Sasaki et al. | |
| 2006/0207440 A1 | 9/2006 | Matsuo et al. | |
| 2006/0237182 A1 | 10/2006 | Godecker et al. | |
| 2007/0051246 A1 | 3/2007 | Suzuki | |
| 2007/0110861 A1 | 5/2007 | Hoffjann et al. | |
| 2007/0272675 A1 | 11/2007 | Kuhne | |
| 2008/0258477 A1 | 10/2008 | Wagner et al. | |
| 2010/0200555 A1 | 8/2010 | Godecker et al. | |
| 2010/0224616 A1 | 9/2010 | Yasuhara | |
| 2010/0230396 A1 | 9/2010 | Boubeddi | |

FOREIGN PATENT DOCUMENTS

| | | |
|---|---|---|
| DE | 19626955 | 1/1998 |
| DE | 19732240 | 4/1999 |
| EP | 0436703 | 7/1991 |
| EP | 0968676 | 1/2000 |
| EP | 1016832 | 7/2000 |
| EP | 1617148 | 1/2006 |
| EP | 1669676 | 6/2006 |
| EP | 1768529 | 5/2010 |
| JP | 2012515322 | 7/2012 |
| WO | WO-9101674 | 2/1991 |
| WO | WO-2007144572 | 12/2007 |
| WO | 2010083387 | 7/2010 |
| WO | WO-2010083387 | 7/2010 |
| WO | 2011056763 | 5/2011 |
| WO | WO-2011056763 | 5/2011 |

OTHER PUBLICATIONS

International Search Report and Written Opinion dated Aug. 5, 2011 in Application No. PCT/US2010/021160.
Notice of Allowance dated Jun. 12, 2012 in U.S. Appl. No. 12/688,483.
Office Action dated Feb. 27, 2012 in U.S. Appl. No. 12/688,483.
Response dated May 23, 2012 in U.S. Appl. No. 12/688,483.
International Preliminary Report on Patentability dated May 18, 2012 in Application No. PCT/US2010/055036.

* cited by examiner

STEAM OVEN WATER DELIVERY AND DRAIN VALVE SYSTEMS AND METHODS

This application claims the benefit of U.S. Provisional Application Ser. No. 61/258,337, filed Nov. 5, 2009, titled "Steam Oven Steam Generator Automatic Drain Valve Configured for Use Specifically, Although Not Necessarily, On-Board Passenger Aircraft," the entire contents of which are hereby incorporated by reference. This application is a continuation of U.S. Ser. No. 12/688,483, filed Jan. 15, 2010, titled "Oven Steam Generator Systems and Methods," the entire contents of which are hereby incorporated by reference.

FIELD OF THE INVENTION

Embodiments of the present invention relate generally to steam ovens used to heat and/or cook food on-board passenger transport vehicles such as aircraft. Such steam ovens receive and use water from the vehicle's on-board water system in order to generate steam. When the oven is not in use, it is desirable to remove the water from the oven as well as the vehicle's plumbing lines. Various embodiments described herein accordingly seek to provide water delivery and draining systems for such ovens.

BACKGROUND

In many instances, it is useful to provide an oven that cooks or heats food products by using steam. Specific uses of such steam ovens may vary, but one particular use is on board aircraft or other transportation vehicles in order to provide a quick, safe, and convenient method for cooking, heating, or re-heating food products.

Some existing steam ovens generate steam by injecting water directly or indirectly onto heating elements of the oven. In some systems, the water is injected inside a warm oven in a mist form, and when the water mist contacts the heating elements or the fan, the mist vaporizes instantly and becomes steam. Other steam ovens generate steam by dripping water into a recessed or depressed tray at the base (or bottom inside surface) of the oven. Other steam ovens deliver steam via water reservoir systems, such as those described in pending U.S. Ser. No. 12/688,483 titled "Oven Steam Generator Systems and Methods."

The water for steam ovens located on-board passenger transport vehicles is typically delivered to the steam oven via the vehicle's water lines. For example, in the aircraft context, water from the on-board pressurized water system is delivered to one or more steam ovens via the aircraft's water lines. These are typically the same water lines that are used to deliver potable water to the coffee makers and any other on-board equipment that requires fresh water use.

When an aircraft is at the gate or otherwise unpowered, its water lines are depressurized and water is allowed to drain back into the on-board water tank or out of the aircraft entirely. Draining the water lines helps prevent water in the lines from freezing during cold temperatures, which can rupture or otherwise damage the lines or associated systems. It also prevents bacteria from building up in trapped, stagnant water if allowed to sit in the steam oven or in the water lines. However, even when the water lines are drained, only the water in the lines behind the vacuum break is allowed to drain, which can leave several feet of line in the steam oven water lines that is not appropriately drained. The result is that even though the aircraft water lines are periodically depressurized and drained, the water in the steam oven system is not drained effectively.

Current steam ovens for use on-board aircraft and other transportation vehicles do not provide appropriate draining features. They either fail to include a drain option entirely, or they require power to be available in order to operate a solenoid valve in the oven for draining the steam generator and associated plumbing system. Accordingly, a solution is needed to efficiently and automatically drain water out of steam ovens that are located on-board aircraft and other passenger transport vehicles.

BRIEF SUMMARY

Embodiments of the present invention provide steam oven drain valve systems and methods for draining steam ovens and associated water lines on-board aircraft or other passenger transport vehicles. Specific embodiments provide power-free and/or automatic draining systems with features that allow water to drain out of steam ovens and associated water lines when the aircraft or other vehicle is unpowered. The systems described work without application of electrical power from the aircraft to operate the drain valve(s). Further features are the ability to automatically drain water from the system to prevent damage from freezing due to expansion, as well as prevents proliferation of bacteria due to stagnant water in the plumbing system. Further features provide a redundant valve system for safety, as well as filters for preventing contamination.

DETAILED DESCRIPTION

Figure 1:
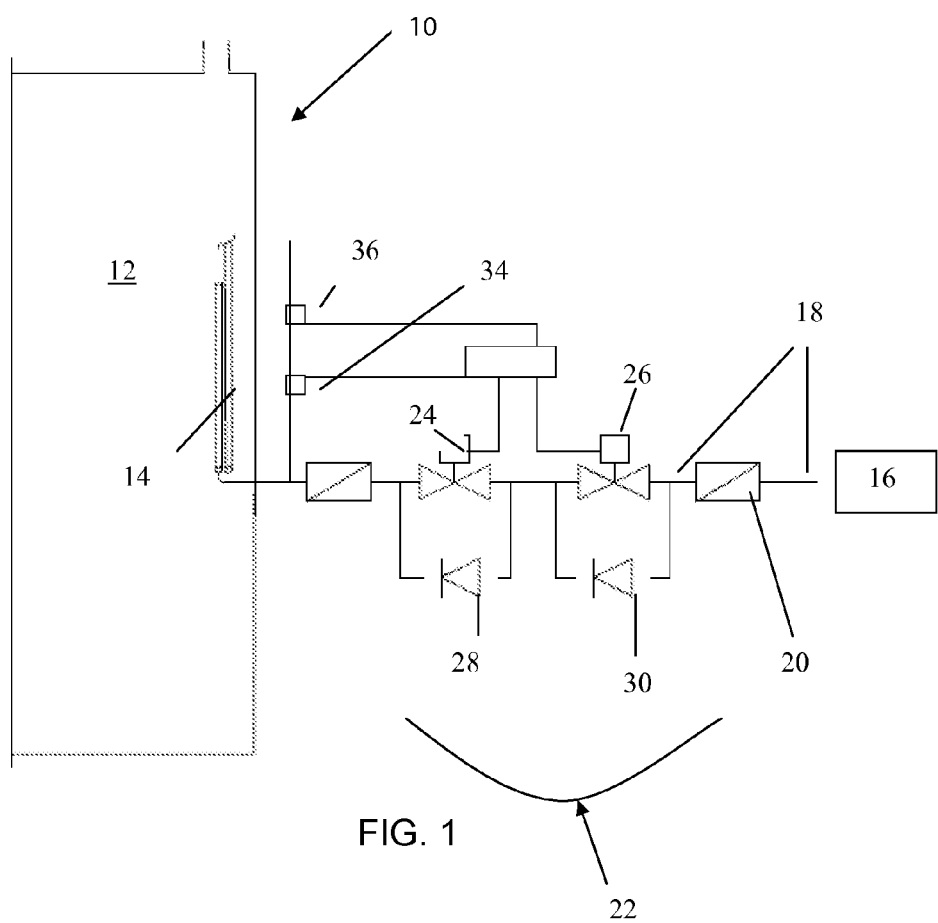
FIG. 1 shows a schematic view of one embodiment of a steam oven having a water delivery and drain valve system.
Figure 2:
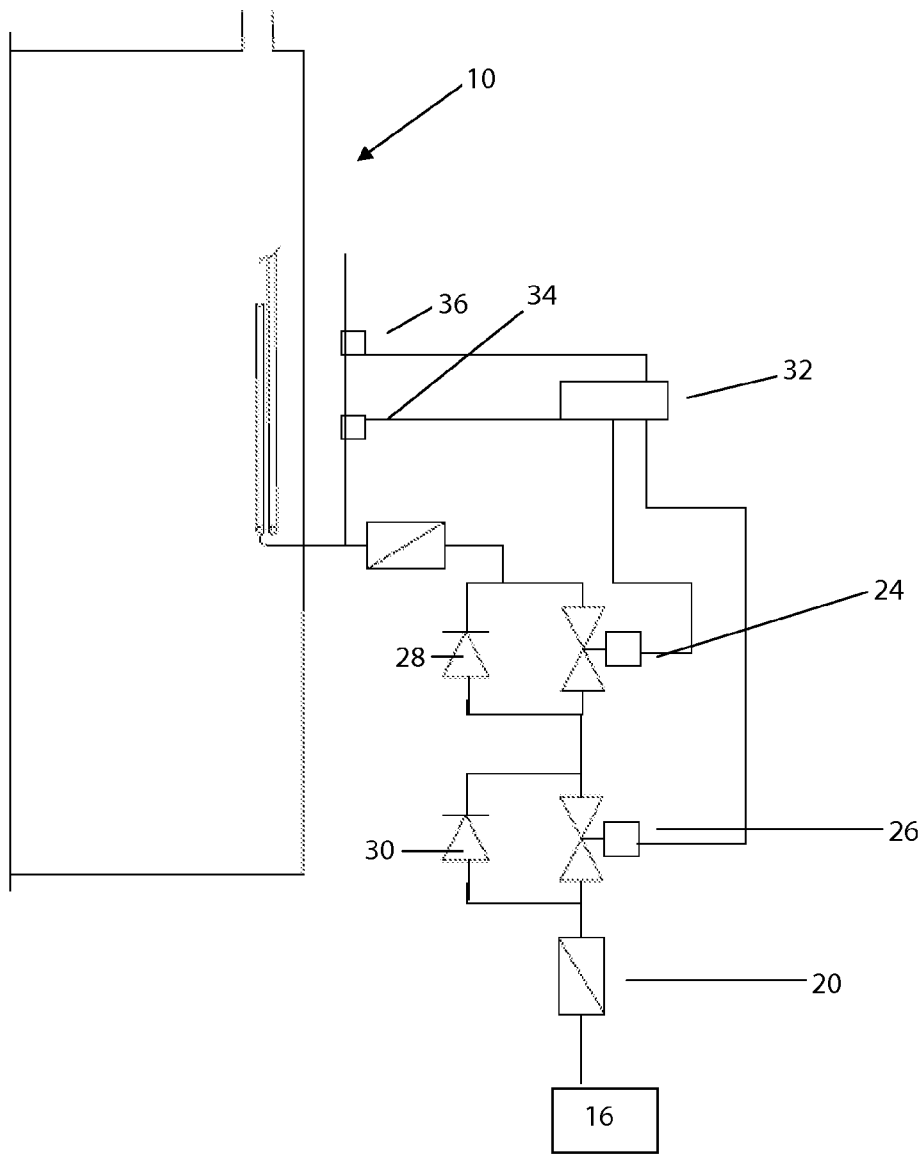
FIG. 2 shows a schematic view of an alternate embodiment of a steam oven having a water delivery and drain valve system.

As illustrated in FIGS. 1 and 2, a steam oven 10 for use on-board an aircraft or other passenger transport vehicle typically has an oven cavity 12 and one or more heater elements 14. Other features are generally available, but because the specific features of the steam oven 10 do not affect the water delivery and drain valve systems described herein, they will not be discussed further. Various types of steam ovens exist, and it should be understood that the systems described herein may be used with any and all types of steam ovens that need to have water delivered thereto from a separate water source and that may also need to be periodically drained. Specific embodiments described are particularly useful in connection with steam ovens that use a water reservoir to generate steam (such as those shown and described in co-pending U.S. patent application Ser. No. 12/688,483 titled "Oven Steam Generator Systems and Methods,") but it should be understood that the systems and methods described herein may be used with any type of steam oven, particularly those located on-board passenger transport vehicles where water lines need to be drained.

FIG. 1 shows one embodiment of a water delivery and drain valve system for use with a steam oven. The system is designed to deliver water from a separately located water source, such as an on-board water tank 16, to a steam oven 10. Water from the tank 16 flows through one or more water supply lines 18 that make up the on-board plumbing system.

Before being delivered to the steam oven, the water in the system may optionally pass through a filter 20, which advantageously removes particulates or other pathogens that may be in the water. One or more filters may be provided, and FIGS. 1 and 2 each show two optional filters in place on the system. (One may filter water prior to its entering the valve system and one may filter water upon its exit from valve system but prior to its entering the steam oven 10.) Filter 20 may be a charcoal filter, a chemical-based filter, an deionization-based filter, or any other appropriate filter that is used to clean water in water systems. Filter(s) may generally act as a strainer to keep dirt particles out of the valves, although more complex filters may be used if conditions warrant. After passing through optional first filter 20, water then reaches valve system 22.

Valve system 22 includes two water delivery valves 24, 26 and two drain valves 28, 30. Providing two water delivery valves (and thus, two drain valves) serves a safety function. If either of the water delivery valves 24 or 26 fails in the open position, having a second valve to close will prevent an overflow or flooding of water into the steam oven 10. This redundancy provides a greater level of safety and control to the system.

Drain valves tend to create challenges in the aircraft or other vehicle context because they introduce a potential point of failure due to valve leakage from contamination. Applicants have overcome this problem by providing a redundant valve system and by protecting the valve(s) from contaminants by using inline filters.

When the system is not in use, water delivery valves 24, 26 remain closed and one or more drain valves 28, 30 is open. When opened, drain valves 28 and 30 allow water from the steam oven to drain back into the aircraft water supply (e.g., the on-board water tanks) through the water lines. When the aircraft water system is pressurized, drain valves 28, 30 close automatically. Drain valves 28 and 30 remain closed any time that the system is under pressure. They may be closed via a check valve, a buoyancy ball that is less than the specific gravity of water, a flapper valve, a one-way valve, a solenoid valve, a by-pass valve, or any other appropriate valve that will cause valves 28 and 30 to remain closed when the system is pressurized, but open once pressure has been released.

Once the steam cooking mode on the oven is selected or the user otherwise indicates to the system that the oven is to be activated, both water delivery valves 24, 26 open. This allows water to be delivered to the oven for the creation of steam.

For the steam oven embodiments that feature a water reservoir (used to create and deliver steam to the steam oven), the system may also feature water reservoir level control circuitry 32. One or more water reservoir level sensors 34 are in communication with the water reservoir level control circuitry 32. In the embodiment shown, there is provided a first water level sensor 34 and a second water level sensor 36. The sensors 34, 36 are provided in order to monitor and detect water levels in the water reservoir. A first sensor 34 may be configured to sense a low water level condition and a second sensor 36 may be configured to sense a high water level condition. Sensors 34, 36 communicate with circuitry 32 in order to control the water delivered to the system based on the detected water levels. The collective system is able to monitor the current water levels in the water reservoir and to adjust the delivery of water and activation of the oven accordingly.

For example, if water level sensor 34 detects that the water level in the reservoir is low (in some embodiments, below sensor 34), circuitry 32 can be set to open both water delivery valves 24, 26 in order to deliver more water to the reservoir. If the circuitry 32 detects that the aircraft water tanks are too low to deliver a sufficient amount of water to the reservoir for heating steam, then circuitry 32 can be set to delivery a warning signal and/or shut off the system (i.e., if the water level is too low to create steam or so low that damage to the system will result if activated). A low water warning indicator (e.g., an LED on the face of the steam oven or a low water warning audible alarm) may be provided in order to indicate to the user that the system is inoperative due to a low water condition.

Once water reaches sensor 34 and sufficient water is present for activation of the steam oven, the low water signal is inhibited. One or both of valves 24 and 26 may be closed. As long as the water level remains above sensor 34, water for sufficient steam generation is available, additional water delivery is not needed, and cooking is allowed to proceed.

Conversely, if water level sensor 36 detects that the water level in the reservoir is approaching a level that is too high (for example, if one of the valves has failed in an open position or if the water sensor 34 fails), circuitry 32 can be set to immediately close one or both of the water delivery valves 24, 26 in order to stop the delivery of water to the reservoir and prevent flooding of the system. If one of the valves were to fail in an open position, water would reach the second sensor 36, which would signal to the control circuitry 32 that the other non-failing valve should be closed. A warning signal (such as a sound or an external light on the oven) may also be activated to let the user know that a valve has failed.

As long as at least one of the water delivery valves 24, 26 is closed, water will not be delivered to the oven. In this way, providing at least two valves 24, 26 provides a back-up safety option if one of the valves were to fail in the open position. If one of the water delivery valves were to fail in a closed position, the oven would be inoperable, but this is considered an acceptable alternative to the flooding disaster that could occur with the use of just a single valve. It should also be understood that more than two water delivery valves may be provided if additional safety or back-up mechanisms are desired or required by the airline manufacturer specifications.

In use, it is optimal for water to be maintained between sensors 34 and 36. This may be achieved by cycling or pulsing one or more of the water delivery valves 24, 26 in order to deliver a constant and desired amount of water to the system. There are a number of options for control logic by which the valves may cooperate—they may be opened independently at the same time, they may be pulsed open and closed so that both valve receives the same number of cycles (preventing one valve from wearing down faster than the other), both valves may open simultaneously, or one may be kept open with the other being cycled in a controlled alternation. As discussed, if one of the valves fails in the open position, the second valve may be used to stop the flow of water to the steam oven.

Once the steam cooking cycle ends or has been stopped, both water delivery valves 24, 26 are signaled closed. Once at least one valve is closed, water is no longer delivered to the steam oven. However, water typically remains in the aircraft water lines 18. If the aircraft or other vehicle is parked for a period of time in a freezing atmosphere, the water in the lines can freeze and cause rupturing, cracking, or other types of damage to the water lines and associated systems. Additionally, the water standing in the lines may become stagnant, which can encourage bacterial growth. Drain valves 28, 30 are thus provided in order to prevent or solve these issues.

When the water delivery valves 24 and 26 are closed and water lines 18 are drained, drain valves 28 and 30 open automatically. This causes the water in the lines 18 to drain completely from the steam oven 10, up to an including valve system 22 and the water reservoir of the steam oven. Valves 28 and 30 are configured to automatically open when the water lines 18 are drained or the system is otherwise no longer under pressure. Valves 28 and 30 allow the several feet of water lines that are between steam oven and the valve 22 system to be drained effectively.

FIG. 2 shows an optimal configuration for using gravity to drain the valve system 22. Once water pressure is removed and valves 28 and 30 are allowed to open, all water in the water lines can drain back to the on-board water tanks 16. On an aircraft, the water tanks are typically between about 5 to 20 feet below the galley. Additionally or alternatively, a negative pressure from the draining process can help pull water out of the system or it is possible to apply a vacuum to the system in order to help suction water out of the water lines.

Changes and modifications, additions and deletions may be made to the structures and methods recited above and shown in the drawings without departing from the scope or spirit of the invention and the following claims.

What is claimed is:

1. A drain valve system for use with a steam oven on board a passenger transport vehicle, comprising:
    A series of water lines;
    At least two water delivery valves configured to deliver water from a pressurized on-board water tank to the steam oven via the water lines;
    a drain valve corresponding to each water delivery valve, wherein each drain valve is configured to open automatically upon removal of pressure from the water lines; and
    a control logic system for controlling drain valve operation, wherein the control logic system works to open the drain valves independently at the same time, to pulse the drain valves open and closed, to open drain valves simultaneously, or to keep one drain valve open while cycling another drain valve in controlled alternation.

2. The drain valve system of claim 1, wherein when the water lines are pressurized, the drain valves close automatically.

3. The drain valve system of claim 1, wherein the drain valves are configured to remain closed when the water lines are pressurized and to open once pressure has been released.

4. The drain valve system of claim 1, wherein the drain valves comprise a check valve, a buoyancy ball that is less than the specific gravity of water, a flapper valve, a one-way valve, a solenoid valve, or a by-pass valve.

5. The drain valve system of claim 1, wherein the drain valves drain via gravity.

6. The drain valve system of claim 1, further comprising one or more filters.

7. The drain valve system of claim 1, further comprising water reservoir level control circuitry.

8. The drain valve system of claim 1, further comprising one or more water reservoir level sensors.

9. The drain valve system of claim 1, installed on-board an aircraft and configured for use with an on-board water system.

10. A draining system for use with a steam oven on-board an aircraft, comprising: One or more drain valves configured to correspond to one or more water delivery valves; the water delivery valves configured to deliver water from a pressurized on-board water tank to the steam oven, the drain valves configured to remain closed when pressurized water is delivered through the water delivery valves and to open upon removal of pressure from the water delivery valves, such that water lines associated with the steam oven are drained when the oven is not in use.

11. A method for draining water lines associated with a steam oven on-board a passenger transport vehicle, comprising:
    (a) providing one or more drain valves;
    (b) providing one or more one or more water delivery valves configured to deliver water from a pressurized on-board water tank to the steam oven; wherein the one or more drain valves are configured to correspond to the one or more water delivery valves;
    (c) configuring the one or more drain valves to remain closed when pressurized water is delivered through the water delivery valves and to open automatically upon removal of pressure from the water delivery valves; and
    (d) allowing water lines associated with the steam oven to be drained.

* * * * *